United States Patent [19]

Pinto

[11] 4,213,954

[45] Jul. 22, 1980

[54] AMMONIA PRODUCTION PROCESS

[75] Inventor: Alwyn Pinto, Stockton-on-Tees, England

[73] Assignee: Imperial Chemical Industries Limited, London, England

[21] Appl. No.: 939,916

[22] Filed: Sep. 5, 1978

[30] Foreign Application Priority Data

Sep. 16, 1977 [GB] United Kingdom ............... 38713/77

[51] Int. Cl.² .................................................. C01C 1/04
[52] U.S. Cl. ............................... 423/359; 423/361; 422/148
[58] Field of Search ............................... 423/359–363; 252/374–377; 55/75; 422/148

[56] References Cited

U.S. PATENT DOCUMENTS

| | | | |
|---|---|---|---|
| 3,441,393 | 4/1969 | Finneran et al. | 423/359 |
| 3,705,009 | 12/1972 | Dougherty | 423/361 |

FOREIGN PATENT DOCUMENTS

| | | | |
|---|---|---|---|
| 1156002 | 6/1969 | United Kingdom | 423/359 |
| 1186939 | 4/1970 | United Kingdom | 423/359 |

OTHER PUBLICATIONS

Olsen et al., Unit Processes & Principles of Chem. Eng., 1932, pp. 1–3.

*Primary Examiner*—O. R. Vertiz
*Assistant Examiner*—Thomas W. Roy
*Attorney, Agent, or Firm*—Cushman, Darby & Cushman

[57] ABSTRACT

An ammonia production process comprising synthesis gas generation and ammonia synthesis with heat recovery in the generation section by steam raising and steam superheating and heat recovery in the synthesis section by steam raising or boiler feed water heating is made more controllable by effecting part of the superheating in the synthesis section, so that a shut-down of the synthesis section results not only in a decrease in steam flow through the superheaters, but also in a decrease in the temperature of the steam fed to them. Thus overheating of the superheaters, a defect of some earlier processes, is avoided. The process is operated with a synthesis pressure under 150, preferably 40–80 bar abs. and preferably synthesis gas generation is based on primary hydrocarbon steam reforming at such a pressure that synthesis gas compression is by under 50%.

7 Claims, 1 Drawing Figure

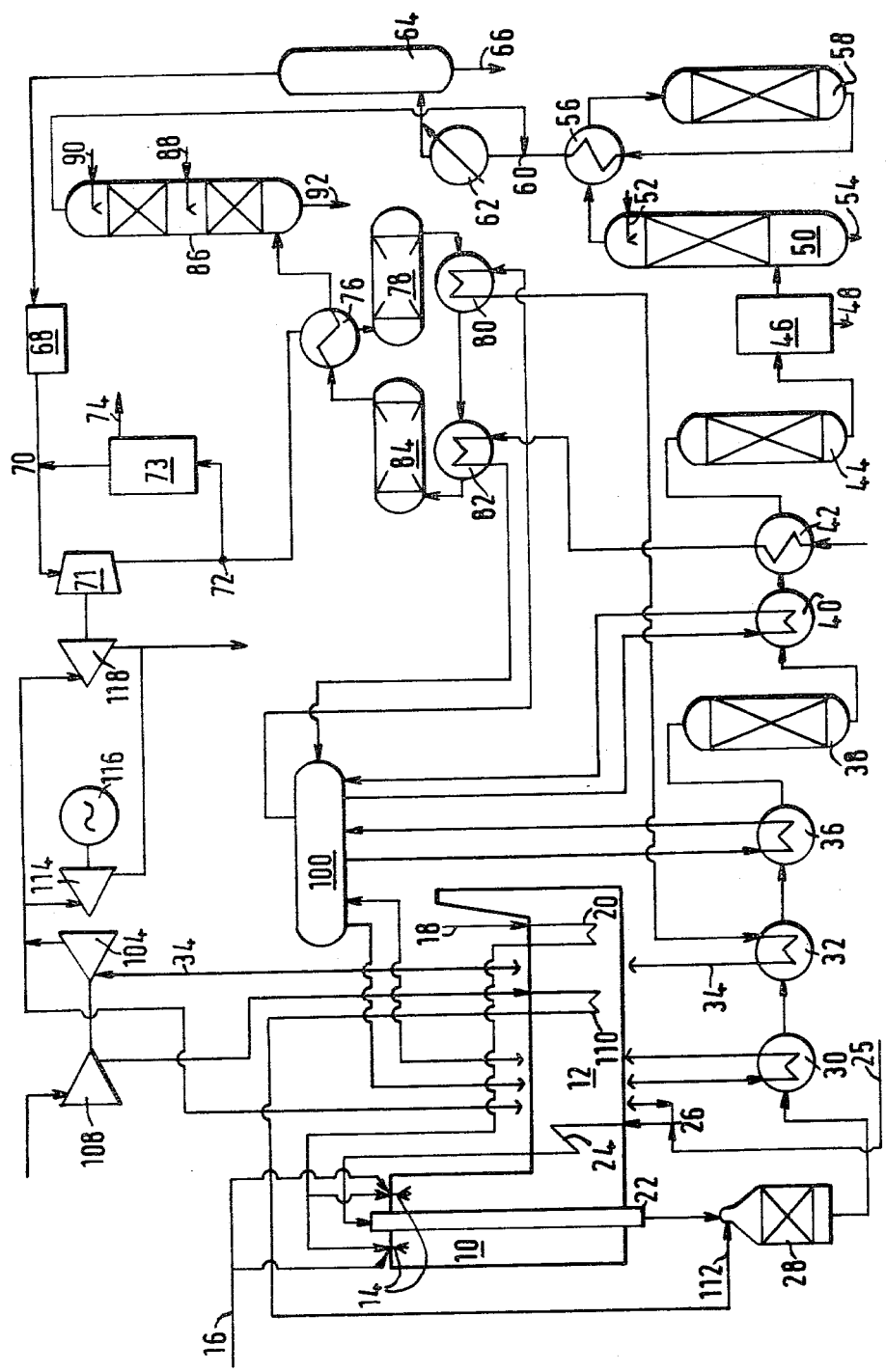

AMMONIA PRODUCTION PROCESS

PROCESS OF PRODUCING AMMONIA

This invention relates to a steam system and in particular to a process of producing ammonia including the system.

Processes for producing ammonia comprise the succession of three main chemical reactions, namely
reaction of carbon with steam and/or oxygen, for example:

$$CH_4 + H_2O \rightarrow CO + 3H_2 \qquad \text{Ia}$$

$$C + H_2O \rightarrow CO + H_2 \qquad \text{Ib}$$

$$C + O \rightarrow CO \qquad \text{Ic}$$

$$CH_4 + O \rightarrow CO + 2H_2 \qquad \text{Id;}$$

shift reaction $$CO + H_2O \rightarrow CO_2 + H_2 \qquad \text{II;}$$

and ammonia synthesis $$N_2 + 3H_2 \rightarrow 2NH_3 \qquad \text{III.}$$

Each of these reactions produces a gas at over 400° C., from which useful heat can be recovered as steam or boiler feed water. In the last decade processes have become established in which steam has been generated at high pressure, usually in the range 60–200 bar abs., superheated, let down in turbines exhausting at the pressure just over that at which reaction Ia is carried out, partly used in reaction Ia and for the rest let down in condensing turbines or turbines exhausting at low pressure. Various ways of integrating the heat recoveries from the hot gases have been proposed. In one system, described in U.S. Pat. No. 3,441,393, steam is raised in boilers heated by process gas from reactions I and II and by flue gas from the furnace in which reaction Ia is carried out, the steam is superheated by the flue gas before being let down in the turbines, and the heat evolved in reaction III is taken up by heating feed water for the boilers. There have been many proposals to raise steam in a boiler heated by reacted ammonia synthesis gas (reaction III), and such steam can be superheated by heat exchange with the flue gas derived from reaction I. A process in which steam is superheated by heat exchange with process gas is described in Chemiker-Zeitung 1974, 98(9), 438–445.

These prior systems are subject to a control defect, namely that a shut-down of the ammonia synthesis section (steps c and d below) of the ammonia production process while the synthesis gas generation section (steps a and b below) continues in operation results in a decrease in the supply of boiler feed water and/or steam from the synthesis section and thus to a decrease in the flow of steam through the superheaters. Since it is impracticable to shut down the generation section quickly, the superheaters become overheated and may suffer damage.

We have now realised that if the ammonia synthesis pressure is less than 150 bar abs., for example in the range 40–80, especially under 60 bar abs., it becomes possible to avoid this control defect. This is because it is practicable to construct a heat exchanger having steam at 60–150 bar abs., on its cold side and ammonia synthesis gas at less than 150 bar abs., on its hot side, and thus to superheat steam in the ammonia synthesis section. By contrast, in synthesis processes at higher pressure it was practicable only to have water on the cold side of such a heat exchanger, in order to keep down its temperature. Thus in our process, whereas a shut-down of ammonia synthesis decreases the flow of steam in the superheaters in the generation section, it also decreases the total superheating capacity of the plant and leaves those superheaters adequately loaded.

According to the invention an ammonia production process comprises the steps of (a) reacting a carbonaceous feedstock with steam and/or oxygen to give a gas containing carbon monoxide;

(b) reacting the product of step (a) over a shift catalyst to convert carbon monoxide and steam to carbon dioxide and hydrogen and removing carbon oxides and steam from the resulting gas;

(c) reacting the hydrogen with nitrogen over an ammonia synthesis catalyst, cooling the reacted synthesis gas and recovering ammonia from it;

(d) heat exchanging hot gases produced in at least step (c) with water in a boiler producing steam at a pressure in the range 60–200 bar abs. and/or in a water heater feeding such a boiler;

(e) superheating steam from such a boiler by heat exchange with hot gases produced in step (a) or step (b); and (f) letting down such steam in one or more expansion engines and thereby recovering useful power; and is characterised by in step (c) (i) reacting and cooling the synthesis gas at a a pressure under 150 bar abs., and (ii) cooling the reacted synthesis gas at least partly by superheating steam produced in step (d) and/or re-heating steam within or from one or more of the engines of step (f).

In the succeeding description the term "stage" will be used to denote an operation forming part of the above defined steps.

Step (a) can be any suitable gasification process, for example non-catalytic partial oxidation of coal, residual hydrocarbon or vaporisable hydrocarbon, catalytic partial oxidation of vaporisable hydrocarbon or catalytic steam reforming. Catalytic steam reforming is conveniently carried out in two stages:

primary reforming a hydrocarbon feedstock with steam to give a gas containing carbon oxides, hydrogen and methane. This stage is carried out with external heating with the aid of a furnace, the flue gas of which is one of the hot gases produced in step (a); and secondary reforming the gas from primary reforming by introducing air and bringing the mixture to equilibrium, whereby to produce a hot gas containing nitrogen, carbon oxides, hydrogen and a decreased quantity of methane.

The hydrocarbon feedstock is preferably methane or other steam reformable hydrocarbon such as a normally gaseous or liquid hydrocarbon boiling at up to about 220° C. Primary reforming can be in one stage over a catalyst with external heating or, when the feedstock is of a higher molecular weight than methane and especially when it is normally liquid, can be in two stages, in the first of which the feedstock is converted to a gas of high methane content at an outlet temperature under 650° C. and in the second of which that gas is reacted in the externally heated process. Various types of supported nickel catalyst are available for these hydrocarbon-steam reactions. The feedstock preferably should be substantially sulphur-free (under 0.5 ppm S) and may have been subjected to a preliminary catalytic hydrodesulphurisation and $H_2S$-removal treatment.

External heating in primary reforming can be effected by having the catalyst in tubes surrounded by a furnace or in adiabatic beds preceded by re-heat zones. Before entering the catalyst, when present in heated tubes, the hydrocarbon steam mixture is preheated, preferably to a temperature in the range 600°–700° C. When the hydrocarbon is methane or ethane it can be used directly at such a high preheat temperature. When it contains 3 or more carbon atoms in the molecule or includes unsaturated hydrocarbons, in preliminary conversion to gas of high methane content is useful in permitting the preferred high preheat temperature.

For a high level of fuel economy the pressure at the outlet of primary reforming is preferably in the range 30–120, especially 40–80 bar abs. and the temperature is in the range 750°–850° C. The steam ratio is preferably in the range 2.5–3.5 molecules of total steam per atom of carbon in the hydrocarbon if all the steam and hydrocarbon are fed to this stage. The methane content of the product gas is typically in the range 10 to 20% by volume on a dry basis and this is preferred, although it is considerably higher than is normally thought suitable in the primary reformer gas of an ammonia synthesis plant.

The feed to secondary reforming includes the primary reforming gas, which may if desired be further heated before entering secondary reforming, and an oxygen-containing gas, which is conveniently air and preferably is preheated to a temperature in the range 400°–700° C. Further steam can be fed or further hydrocarbon feedstock if it is desired to minimise the total steam ratio without having too low a steam ratio in primary reforming but usually all the hydrocarbon and steam are fed to primary reforming. The outlet pressure is conveniently about the same as at the outlet of primary reforming apart from the pressure drop through the secondary reforming catalyst. The outlet temperature is preferably in the range 950°–1050° C. and the outlet methane content in the range 0.2 to 10% v/v on a dry basis. The excess of air results in a gas containing 2.0 to 2.9, especially 2.2 to 2.7 molecules of hydrogen equivalent (i.e. total of $H_2$ and CO) per molecule of nitrogen. The catalyst can be for example a supported nickel catalyst or chromium oxide catalyst or a combination thereof.

The process in which there is used a quantity of air in excess of what would introduce 1 molecule of nitrogen per 3 molecules of hydrogen is preferably combined, as described in our copending UK application taking priority from UK application 35096/77, 44766/77 and 44996/77, with the subsequent feature, as part of step (c), of treating synthesis gas after reaction to synthesise ammonia to separate a stream enriched in hydrogen and returning the enriched stream to the synthesis.

In the steps so far described, heat is recovered from the reforming furnace flue gas, if steam reforming is used. The flue gas is typically at 900°–1000° C. after it has left the radiative zone of the furnace in which the catalyst is heated. Suitably in the flue gas duct (also referred to as the "convective zone") it is heat-exchanged first with the steam-hydrocarbon mixture about to be fed to the catalyst, then possibly though not preferably with high pressure steam, then possibly with the tubes of a boiler raising steam at 60–200 bar abs., then possibly with a boiler feed water heater, heaters for natural gas and secondary reformer air and finally a low grade heat recovery such as a furnace combustion air direct preheater or a water heater as described in our UK application 8732-14553/75 (published as German application 2608486) supplying hot water as a source of heat for furnace combustion air or of part of the process steam. The steam at 60–200 bar abs. is to be used, after superheating, as the working fluid in an expansion engine such as a turbine, the exhaust of which is partly used as the steam supply to step (a) and partly, after reheating, in one or more further turbines exhausting to condenser or at a few bar pressure. Steam that has been or is to be superheated or re-heated in heat exchange with reacted ammonia synthesis gas and possibly also by process gas can advantageously be superheated or re-heated in part by furnace flue gas.

Whether or not step (a) involves primary steam reforming, heat is recovered from the hot process gas when cooling it to the inlet temperature of step (b). The heat recoveries are similar to those of furnace flue gas, except that preheating of the steam-hydrocarbon mixture or of secondary reformer air is not usually effected by cooling process gas. Superheating or reheating by process gas can be advantageously applied to steam that has been or is to be superheated or reheated in heat exchange with reacted ammonia synthesis gas.

For step (b) the gas from step (a) is cooled with the recovery of useful heat to the inlet temperature of the "shift" catalyst over which the reaction of carbon monoxide with steam occurs. Usually this temperature is in the range 300°–400° C., especially 320°–350° C., appropriate to iron-chrome shift catalysts. The reaction over the iron-chrome catalyst is exothermic (outlet temperature 400°–450° C.) and the outlet gas is again cooled with recovery of useful heat in a similar manner to the cooling of process gas from step (a), including superheating or reheating of steam that has been or is to be superheated or reheated in heat exchange with reacted ammonia synthesis gas.

In addition to the superheating and/or reheating by one or more of flue gas, reformer gas or shifted gas, it is preferred to use an independently fired heater to provide 20° to 50° C. of the steam temperature increase. Such a heater can be rapidly shut down if the steam flow to the other superheaters or reheaters decreases. Suitably the heat taken from reacted synthesis gas and the fired heater amounts to 40–60% of the total superheating.

The heat recoveries after high temperature shift cool the gas sufficiently to permit further shift reaction, and this is carried out preferably over a copper-containing catalyst, for which the inlet temperature is suitably 200°–240° C. and the outlet temperature 240°–270° C. Such a low-temperature shift stage produces a gas containing usually 0.2 to 0.6% v/v of carbon monoxide on a dry basis. Since the pressure is higher than has been generally used in low temperature shift, the steam to dry gas ratio over the low temperature shift catalyst is kept down to a level that avoids damage to the catalyst, preferably in the range 0.1 to 0.3. This means that the steam to carbon ratio in primary and secondary reforming should not be too high, but it can be readily attained using ratios in the range 2.5 to 3.5 (methane feedstock) or 2.4 to 3.2 (feedstock of empirical formula $CH_2$) or in intermediate ranges for hydrocarbons of intermediate composition. The higher nitrogen content due to excess air helps to keep down the steam to dry gas ratio. If it is desired to use a higher steam to carbon ratio, or to add extra steam in or after secondary reforming, the steam to dry gas ratio can be kept down by recycling synthesis gas after carbon oxides removal.

The outlet temperature of the low temperature shift stage is too low to produce high pressure steam, but useful heat can be recovered from the shifted gas in lower grade heat recoveries such as boiler feed water heating and feedstock heating in series or parallel with the recoveries from the hotter gases already described and also such as carbon dioxide removal solution regeneration and aqueous ammonia distillation.

If other shift conversion systems such as iron chrome/$CO_2$ removal/iron chrome or systems based on catalysts containing other Group VI and Group VIII metals and oxides or an alkali metal compounds of weak acids are used, analogous heat recoveries are effected.

Removal of carbon oxides is usually carried out in a first stage in which carbon dioxide is substantially removed, and in a second leaving carbon oxides at such a low level that the synthesis catalyst is not significantly poisoned by them. If desired, any carbon monoxide remaining after shift can be selectively oxidised to carbon dioxide.

The shifted gas is cooled to below the dewpoint of steam, water is separated, and then the first stage can be carried out using any liquid absorbent. Chemical systems such as Benfield's potassium carbonate or diethanolamine potassium carbonate, "Vetrocoke", "Catacarb" or amine systems such as monoethanolamine can be used. These have, however, the disadvantage of consuming a substantial quantity of steam in the regeneration of the liquid absorbent, a requirement that is especially inconvenient when the shift steam to dry gas ratio is at the preferred low levels. A 2-stage carbon dioxide removal, in the first stage of which most of the carbon dioxide is absorbed in an amine, such as triethanolamine, that is regenerable substantially without heating, and in the second stage of which an absorbent is used that does require heat regeration, is therefore preferable. The preferred high pressure in step (a), which is substantially maintained apart from inevitable pressure drops in subsequent steps, makes possible the use of "physical" absorbents, the preferred examples of which can be regenerated merely by lowering pressure. Suitable absorbents used in industrially developed processes are tetramethylene sulfone ("Sulfinol"), propylene carbonate (Fluor), N-methyl-2-pyrrolidone ("Purisol"), methanol ("Rectisol") and the dimethyl ether of polyethyleneglycol ("Selexol").

If desired, part or all the carbon dioxide can be removed by absorption in anhydrous or aqueous ammonia. Such a procedure is especially useful if the ammonia to be produced by the process of the invention is to be used for urea synthesis or for making ammonium sulphate by the calcium sulphate process. In a convenient form of the process, applicable especially when it is desired to operate at pressures less than optimal for using physical absorbents, the bulk of the carbon dioxide can be removed in a physical absorbent and the remainder in a chemical solvent as mentioned above or in ammonia. The latter procedure can be designed to suit any desired relative outputs of ammonia, carbon dioxide and urea.

The second stage of carbon oxides removal can be carried out by cryogenic separation or by contacting the gas with a carbon oxides absorbent such as copper liquor, but is most conveniently effected by catalytic methanation, for example over a supported nickel catalyst at an outlet temperature in the range 250°–400° C. This decreases the carbon oxides content to a few parts per million by volume but produces water, which can be removed by cooling, separation and passage over a water-absorbent such as alumina or a molecular sieve. If nitrogen is not already present it can be added by means of liquid nitrogen washing of the gas after the first stage of carbon oxides removal.

The dried gas from step (b) contains nitrogen, hydrogen preferably in less than the stoichiometric ratio for ammonia synthesis, a small quantity (usually under 1% v/v) of methane and fractional percentages of noble gases introduced with the secondary reformer air, and is thus ready for use as an ammonia synthesis gas. It may be compressed to any convenient synthesis pressure up to 150 bar abs., but at the high pressure preferred for steps (a) and (b) it is suitable for use in the synthesis with less than 50% compression and preferably no more than the increase in pressure (for example up to 20%) encountered in a synthesis gas circulator. As an alternative a rather greater degree of compression can be used such as can be provided ay a single-barrel compressor circulator, conveniently by 20–80 bar. As a result of operating with such low degrees of compression, the requirement for high pressure steam is considerably less than in most conventional ammonia plants and consequently the superheating that can be conveniently provided in the synthesis loop is a greater fraction of the total superheat requirement.

The "fresh" synthesis gas from step (b) can be fed through a succession of catalytic stages and ammonia removal stages but, as in most ammonia synthesis processes, is preferably mixed with synthesis gas recycled from an ammonia removal stage. At the preferred synthesis pressures the attainable pass conversion over the synthesis catalyst is relatively low, giving an ammonia outlet concentration in the range 8 to 12% v/v. The ratio of recycled gas to fresh gas is suitable in the range 4 to 6.

The catalyst used in the ammonia synthesis can be of the usual composition, namely iron with promoting quantities of non-reducible oxides such as those of potassium, calcium, aluminium and others such as of beryllium, cerium or silicon. In order to afford maximum activity and thus to compensate for the lower rate of reaction due to low pressure, the iron catalyst preferably contains also cobalt, suitably to the extent of 1–20% w/w calculated as $Co_3O_4$ on the total oxidic composition from which the catalyst is made by reduction and in which the iron oxide is assumed to be all $Fe_3O_4$. The catalyst can be in the form of particles in the sieve range 18 to 4 ASTM (1–4.7 mm) especially 10 to 5 (2–4 mm), if it is desired to maximise their available contact surface or larger, for example up to 20 mm; the arrangement of the catalyst in the synthesis reactor preferably therefore may afford short gas flow paths, such as by radial or secantial flow in a cylindrical reactor. The outlet temperature of the synthesis catalyst is preferably in the range up to 500° C., especially 350°–430° C. This is lower than has been usual, in order to obtain a more favourable synthesis equilibrium. The catalyst volume is suitable in the range 100–200 m³ per 100 metric tons per day output; this is higher than has been usual but can be tolerated because at the low operating temperature and pressure the reactor can be of simple construction for example of the hot-wall type.

Reacted gas can be cooled during, between stages of or after the synthesis by any convenient means, but according to the invention the hot gas at some point is heat exchanged with high pressure steam (60–200 bar abs.) generated by cooling furnace flue gas or step (a) process gas or high temperature shift outlet gas, or with intermediate pressure steam (30–120, especially 40–80 bar abs.) exhausted from a pass-out turbine or generated independently. Preferably this heat exchange of steam precedes the other superheating or reheating heat exchanges. Suitably it raises the temperature of high pressure steam by 20°–60° C., and effects 15 to 30% of the total superheating. Preferably the steam is heat exchanged with reacted synthesis gas leaving one, preferably the first, of a succession of catalyst beds, and preferably before the reacted gas has been cooled in any other heat exchange. The heat exchange with steam is preferably followed by heat exchange with feed water for the boilers of step (a) or step (b) and these two heat exchangers are operated preferably so as to cool the reacted synthesis gas from one catalyst bed to the temperature at which they are to enter the next bed. After the gas has left all the catalyst beds or parts thereof it is cooled by heat exchange with incoming unreacted synthesis gas and conveniently also with boiler feed water, each in one or more stages and in any convenient order and then finally cooled to ammonia separation temperature.

The recovery of ammonia from reacted synthesis gas can be carried out by ordinary air-cooling or water-cooling if the pressure is high enough, but at preferred pressures in the range 40–80 bar. abs. is best carried out by absorption in water. Absorption in an acid or on a solid such as zinc chloride can be used if convenient. Absorption in water is conveniently carried out in two or more stages, for example in the first of which the gas contacts a relatively strong ammonia solution (for example 15 to 30% w/w) and in the last pure water or a weak ammonia solution (for example up to 10% w/w). After the absorption stage the gas is dried in order to prevent too-rapid deactivation of the catalyst be water. The aqueous ammonia product can be used as such or distilled to recover anhydrous ammonia from it.

When the fresh synthesis gas contains nitrogen in excess of the stoichiometric proportion, noble gases and also methane to an extent dependent on the incompleteness of the secondary reforming reaction and of the shift reaction, the continued removal of ammonia from it, especially in a recycle process, results in a substantial concentration of non-reacting gases. It is preferred to treat the gas mixture to keep the concentration of such gases below 10% v/v especially below 5.0% v/v. This treatment could be applied to the fresh or mixed synthesis gas before entering the synthesis or to the whole of the reacted gas after removal of ammonia, but it is preferred to apply it only to a side stream, because then any failure of the treatment plant does not cause a shut-down of the whole production process. The side stream can conveniently be taken from the gas downstream of the ammonia separation and treated for hydrogen separation, whereafter the hydrogen is returned to the circulating synthesis gas. It could in principle be taken before ammonia separation but the treatment would then involve also ammonia recovery. The hydrogen separation treatment involves a pressure-drop and may involve also a pressure let-down through an expansion engine in order to decrease the gas temperature for cryogenic separation; consequently the hydrogen stream has to be compressed in order to return it to the synthesis. Preferably therefore the side stream is taken from the effluent of the circulator, where the gas pressure in the system is highest, and the separated hydrogen stream is returned to the inlet of the circulator, where the gas pressure is lowest. Part or all of the separated hydrogen stream can be recycled to the low temperature shift inlet.

The hydrogen separation treatment can be by any suitable means, for example by cryogenic fractionation, molecular sieve adsorption of gases other than hydrogen or palladium membrane diffusion. The hydrogen stream returned to the synthesis can be substantially (over 90% v/v) pure but in any event should contain at least 3 molecules of hydrogen per nitrogen molecule. The non-reactive gases discarded from the hydrogen separation treatment should of course be substantially free of hydrogen, since any discarded hydrogen represents wasted energy. If the side stream contains methane, the separation treatment can be designed and operated to separate a methane-rich stream and that stream can be used as process feed or furnace fuel for primary reforming or fed to secondary reforming. It will be appreciated that the magnitude of the side stream and the purity of the returned hydrogen are the subject of design optimisation. A typical side stream flow rate is in the range 15 to 30% of total gas flow.

The plant in which the process of the invention takes place is a new combination and constitutes a further feature of the invention.

The drawing, a flowsheet of one preferred form of the invention, shows the major processing steps and heat exchanges.

The process is based on steam-natural gas reforming. The reforming furnace has a radiative zone 10 and a convective zone 12. Zone 10 is heated by burners 14 fed with preheated natural gas from 16 and air fed in at 18 and preheated at 20 at the low temperature end of convective zone 12. The catalyst tubes 22 heated in radiative zone 10 are fed with a steam/natural gas mixture strongly preheated at 24 in the hottest part of convection zone 12. The mixture is formed at 26 from warm natural gas fed at 25 from a desulphurisation plant (not shown) and medium pressure steam the source of which will be described below. Gas leaving tube 22 consists of carbon oxides, hydrogen and methane, and is partly burnt with air supplied at 112 (after preheating at 110 at an intermediate level in convective zone 12) in secondary reformer 28 and then brought to equilibrium at a lower methane content over the secondary reformer catalyst. The gas leaving secondary reformer 28 is cooled in boiler 30 feeding high pressure steam drum 100, then cooled further in the heat exchangers 32 (a steam superheater feeding steam through line 34 to turbine 104) and boiler 36 also feeding stream drum 100. At high temperature shift inlet temperature it now enters reactor 38 in which carbon monoxide reacts with steam to give carbon dioxide and hydrogen. This reaction is exothermic and the hot reacted gas is cooled in heat exchanger 40 (a boiler feeding steam drum 100) and 42 (a boiler feed water heater) to the inlet temperature of the low temperature shift catalyst in reactor 44. In 44 the carbon monoxide/steam reaction goes almost to completion. The reacted gas is treated in 46, which indicates generally low grade heat recovery by for example heating boiler feed water and heating a carbon dioxide absorbent regeneration, followed by a cooler and condensate separator from which water is taken at 48. It then passes into packed carbon dioxide absorber 50 in which it contacts absorbent liquid fed in at 52. Charged absorbent leaves the absorber at 54 and is passed through a regenerator (not shown) and then returned to feed point 52. Gas leaving the top of absorber 50 is heated in feed/effluent heat exchanger 56 to methanation inlet temperature and passed over a supported nickel catalyst in reactor 58 to convert residual carbon oxides to methane. Methanated gas is united at 60 with a recycle stream to be described and the mixture is cooled at 62 to below the dewpoint of steam and passed into separator 64, from which condensate is removed at 66. Gas leaving separator 64 is dried at 68, mixed at 70 with a recycle hydrogen stream to be described and fed to circulator 71 in which its pressure is increased sufficiently to maintain circulation. A part stream of gas is diverted at 72 into hydrogen separation unit 73 which typically includes a cryogenic fractionation plant in which the gas is cooled to about minus 188° C. to condense out nitrogen, methane and noble gases, whereafter the uncondensed fraction is fed back to point 70 as the recycle hydrogen stream already mentioned. In 73 the condensed fraction is re-evaporated in order to cool gas entering the unit, whereafter it leaves at 74. If the condensed fraction contains sufficient methane it can be fed to 16 as part of the fuel in furnace 14: alternatively it can be fractionated during evaporation in order to produce a methane stream to be used as furnace fuel or process feed. The stream recycled to 70 can be a nitrogen-hydrogen mixture if the circulating gas is approximately stoichiometric in composition or can be over-rich in hydrogen if the circulating gas contains excess nitrogen. The remainder of the gas passes from point 72 to feed/effluent heat exchanger 76, in which it is heated to catalyst inlet temperature, and thence to the inlet of the catalyst bed in synthesis reactor 78. Ammonia synthesis takes place and the resulting hot reacted gas is cooled in steam superheater 80 and boiler feed water heater 82 and passed through the catalyst bed in reactor 84 where it undergoes further ammonia synthesis. The resulting hot reacted gas passes out through the hot side of feed/effluent heat exchanger 74 and further heat exchanger and cooling stages (not shown) and enters two-stage ammonia absorber 86 in which the bulk of its ammonia content is removed by contact with lean aqueous ammonia fed in at 88 and its residual ammonia content is removed by cold water fed in at 90. A strong aqueous ammonia solution is taken off at 92 and fed to a distillation plant (not shown) from which anhydrous liquid ammonia is removed by condensation overhead and from which streams 88 and 90 are recovered as bottoms. Gas leaving the top of absorber 86 is recycled to point 60, at which it is united with fresh synthesis gas.

The steam system that characterises the process according to the invention is based, in this preferred flow-sheet, on common steam drum 100. Drum 100 is fed with treated boiler water heated in exchanger 82 by reacted ammonia synthesis gas: the feed to exchanger 82 is already warm as a result of low grade heat recoveries such as 42 and other positions not shown such as in coolers in item 46, in cooler 62, between items 84 and 86 and in convective zone 12 of the steam reforming furnace. Water circulates from drum 100 through boilers 30, 36 and 40 already described. Steam passing overhead from drum 100 is superheated in heat exchanger 89 by reacted ammonia synthesis gas, superheated further by hot raw synthesis gas at 32 and let-down in high pressure passout turbine 104 driving process air compressor 108, which supplies hot air as a result of limited inter-stage cooling and feeds secondary reformer 28 at point 112 by way of preheater 110. Exhaust steam from turbine 104 is at medium pressure. A part-stream of it is mixed with hot natural gas at 26, strongly preheated at 24 and fed to the catalyst in tubes 22, as already described. A further part stream is fed to turbine 114 driving alternator 116 supplying the electricity to be used in drives other than process air compressor 108 and circulator 68. A third part stream is fed to turbine 118 driving circulating compressor 68. Turbines 114 and 118 are both of the pass-out type. Their exhaust steam, led out at 120, is used in low-grade heating duties, principally the distillation of aqueous ammonia taken off at 92. In such duties it is condensed and the condensate may be recovered and after de-aeration used as boiler feed water.

In this process it is evident that if the ammonia synthesis section represented by numerals 60 to 90 is shut down, for example as a result of operation of a control device protecting circulator 71, there will be no exothermic heat of synthesis recovered in boiler feed water heater 82, so that cooler water will be fed to drum 100 and its steam output will be decreased. At the same time, however, the smaller flow of steam will be passed to superheater 32 at a lower temperature because, in the absence of exothermic heat of synthesis, it has not been superheated at 80. Consequently the heat load in superheater 32 is maintained at approximately its normal level. The same would apply to a superheater in flue gas duct 12 instead of or in addition to superheater 32, if one were used.

In a typical ammonia synthesis process producing 1500 metric tons (te) per day of ammonia 210 te/h of steam are generated in drum 100 at 340° C., 146 bar abs. pressure. This steam is superheated to 395° C. by heat exchange with reacted synthesis gas at 80, to 480° C. in heat exchange with process gas at 32 and to 510° C. in a fired heater (not shown) independent of the primary reformer. It is then let down in turbine 104 to 58 bar abs. and the exhaust is in part (100 te/h) fed to the process at 26 and for the rest let down in turbines 114 and 118.

The Table shows the high pressure steam output rates and heat loads for a process according to the invention in which the primary reformer outlet pressure at 22 and the ammonia synthesis pressure (outlet of 71) are both 50 bar abs., in comparison with a conventional process in which those pressures are respectively 30 and 220 bar abs. and compression is by a compressor driven by a turbine in which high pressure steam is let down.

TABLE

|  | Conventional | This invention |
|---|---|---|
| Steam output te h$^{-1}$ | 262.5 | 210 |
| Total heat load in saturated steam, te cal $^{-1}$ | 145975 | 116780 |
| Total steam superheat load, te cal h$^{-1}$ | 65687 | 35550 |
| Heat recovered from synthesis as boiler feed water (hence as steam), te cal h$^{-1}$ | 40000 | 23000 |
| as steam superheat, te cal h$^{-1}$ | — | 17000 |
| Controlled superheat in fired heater, te cal h$^{-1}$ | — | 4150 |
| Synthesis steam ÷ total steam | 27.4% | 19.7% |
| Synthesis and controlled |  |  |

TABLE-continued

| | Conventional | This invention |
|---|---|---|
| superheat ÷ total superheat | — | 59.5% |

It is evident that, by using less of the heat recovered from synthesis to raise steam via boiler feed water heating, the effect of the loss of this steam in a shut-down is less, since it is only 19.7% of the total instead of 27.4% as in a conventional process. Since the superheat contribution of the synthesis heat recovery and the small fired heater is 59.5%, loss of the synthesis heat leaves the process gas superheater 32 more than fully loaded. If, however, the total synthesis heat recovery (40000 te cal h$^{-1}$) had been as boiler feed water in the 50 bar abs. process, the decrease in steam flow resulting from shut down of ammonia synthesis would have been 34.2% and thus superheater 32 would have been subject to overheating.

I claim:

1. In an ammonia production process which comprises the steps of
   (a) reacting a carbonaceous feedstock with steam and/or oxygen to give a gas containing carbon monoxide;
   (b) reacting the product of step (a) over a shift catalyst to convert carbon monoxide and steam to carbon dioxide and hydrogen and removing carbon oxides and steam from the resulting gas;
   (c) reacting the hydrogen with nitrogen over an ammonia synthesis catalyst, cooling the reacted synthesis gas and recovering ammonia from it;
   (d) heat exchanging hot gases produced in at least step (c) with water in a boiler producing steam at a pressure in the range 60–200 bar abs. and/or in a water heater feeding such a boiler;
   (e) superheating steam from such a boiler by heat exchange with hot gases produced in step (a) or step (b); and
   (f) letting down such steam in one or more expansion engines and thereby recovering useful power,
   said process being previously subject to the defect that an accidental shut down of ammonia synthesis in step (c) decreases the supply of steam from step (d) and thus causes overheating of the heat exchangers providing superheating in step (e);
   in step (c) (i) reacting and cooling the synthesis gas at a pressure under 150 bar abs., and
   (ii) cooling the reacted synthesis gas at least partly by superheating steam produced in step (d) and/or reheating steam within or from one or more of the engines of step (f) whereby such a decrease in said supply of steam is accompanied by a compensating decrease in superheating capacity.

2. A process according to claim 1 in which step (a) comprises primary and secondary catalytic steam reforming of a hydrocarbon feedstock and in step (ii) high pressure steam is superheated in heat exchange with reacted ammonia synthesis gas and further superheated in heat exchange with the flue gases of the furnace used in primary reforming and/or with the hot gas produced by secondary reforming.

3. A process according to claim 1 in which ammonia synthesis is at a pressure in the range 40–80 bar abs., the outlet pressure of primary steam reforming is also at a pressure in that range and the gas after step (b) and before step (c) is compressed by less than 50%.

4. A process according to claim 1 in which 15–30% of the total steam superheating is by heat exchange with reacted ammonia synthesis gas.

5. A process according to claim 1 in which part of the steam superheating is by an independently fired heater and the heat taken from reacted synthesis gas and the fired heater amounts to 40–60% of the total superheating.

6. A process according to claim 1 in which ammonia synthesis is carried out in a succession of catalyst beds and the high pressure steam is heat exchanged with reacted synthesis gas leaving the first of such beds before that gas has been cooled in any other heat exchange.

7. A process according to claim 6 in which the heat exchange with steam is followed by heat exchange with feed water for the boilers of step (a) or step (b) and these two heat exchangers are operated so as to cool the synthesis gas to the inlet temperature of the next catalyst bed.

* * * * *